US012712599B2

(12) United States Patent
Wang et al.

(10) Patent No.: US 12,712,599 B2
(45) Date of Patent: Aug. 18, 2026

(54) CONTROL METHOD AND APPARATUS FOR NETWORK NODE, AND COMPUTER-READABLE STORAGE MEDIUM

(71) Applicant: ZTE CORPORATION, Shenzhen (CN)

(72) Inventors: Yuxin Wang, Shenzhen (CN); Zhaohua Lu, Shenzhen (CN); Yong Li, Shenzhen (CN); Yijian Chen, Shenzhen (CN); Jianwu Dou, Shenzhen (CN); Jun Yang, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 275 days.

(21) Appl. No.: 18/565,856

(22) PCT Filed: May 30, 2022

(86) PCT No.: PCT/CN2022/095991
§ 371 (c)(1),
(2) Date: Nov. 30, 2023

(87) PCT Pub. No.: WO2022/253184
PCT Pub. Date: Dec. 8, 2022

(65) Prior Publication Data

US 2024/0259052 A1 Aug. 1, 2024

(30) Foreign Application Priority Data

Jun. 3, 2021 (CN) ......................... 202110620564.5

(51) Int. Cl.
*H04B 7/04* (2017.01)

(52) U.S. Cl.
CPC ................................ *H04B 7/04013* (2023.05)

(58) Field of Classification Search
CPC ......... H04W 72/1242; H04W 72/1268; H04W 72/1289; H04W 72/12; H04W 72/10;
(Continued)

(56) References Cited

U.S. PATENT DOCUMENTS

2013/0258897 A1* 10/2013 Park ...................... H04W 24/10
370/252
2019/0044246 A1 2/2019 Pitsillides et al.
(Continued)

FOREIGN PATENT DOCUMENTS

CN 110099423 A 8/2019
CN 110336575 A 10/2019
(Continued)

OTHER PUBLICATIONS

Samir et al: "Optimizing Age of Information Through Aerial Reconfigurable Intelligent Surfaces: A Deep Reinforcement Learning Approach", IEEE Transactions on Vehicular Technology, IEEE, USA, vol. 70, No. 4, Mar. 5, 2021, pp. 3978-3983, XP011852520, ISSN: 0018-9545, DOI: 10.1109/TVT.2021.3063953 (Year: 2021).*
(Continued)

*Primary Examiner* — Nathan S Taylor
(74) *Attorney, Agent, or Firm* — Vivacqua Crane, PLLC

(57) ABSTRACT

Disclosed are a control method and apparatus for a network node, and a computer-readable storage medium. The method may include receiving a signaling sent by a base station, where the signaling is indicative of at least one of, an operating mode or a phase state of the network node; and regulating at least one of, the operating mode or the phase state of the network node according to the signaling.

17 Claims, 6 Drawing Sheets

(58) Field of Classification Search

CPC . H04W 52/08; H04W 52/146; H04W 52/325; H04W 52/362; H04W 52/367; H04W 52/54; H04W 72/044; H04W 72/23; H04W 52/32; H04W 72/04; H04L 5/00; H04L 1/1861; H04L 1/1864; H04L 5/0053; H04L 5/0091; H04L 1/00; H04L 1/0041; H04L 1/0045; H04L 1/0069; H04L 1/08

See application file for complete search history.

(56) References Cited

U.S. PATENT DOCUMENTS

| | | | | |
|---|---|---|---|---|
| 2020/0053734 | A1* | 2/2020 | Aiba | H04W 52/367 |
| 2021/0006302 | A1* | 1/2021 | Nayeb Nazar | H04B 7/0632 |
| 2021/0013619 | A1 | 1/2021 | Alkhateeb et al. | |
| 2021/0014095 | A1* | 1/2021 | Ly | H04L 5/0094 |
| 2021/0068142 | A1* | 3/2021 | Park | H04W 72/0453 |
| 2021/0410135 | A1* | 12/2021 | Yu | G06N 3/048 |
| 2022/0014935 | A1* | 1/2022 | Haija | H04B 17/336 |
| 2022/0077919 | A1* | 3/2022 | Li | H04B 7/04013 |
| 2022/0330289 | A1* | 10/2022 | Chen | H04L 1/1664 |
| 2022/0377730 | A1* | 11/2022 | Yang | H04W 52/36 |
| 2023/0114410 | A1* | 4/2023 | Jang | H04L 1/0016<br>370/329 |
| 2023/0136962 | A1* | 5/2023 | Jiang | H04W 16/28<br>370/329 |
| 2023/0261708 | A1* | 8/2023 | Jiang | H04B 7/061<br>370/252 |
| 2023/0308139 | A1* | 9/2023 | Baligh | H04B 7/04013 |
| 2023/0308140 | A1* | 9/2023 | Baligh | H04B 7/04013 |
| 2023/0318686 | A1* | 10/2023 | Kwak | H04B 7/0639<br>455/101 |
| 2023/0327714 | A1* | 10/2023 | Baligh | H04B 7/088<br>375/262 |
| 2023/0344576 | A1* | 10/2023 | Lim | H04B 7/06968 |
| 2023/0354295 | A1* | 11/2023 | Zhu | H04W 72/12 |
| 2023/0413258 | A1* | 12/2023 | Yoon | H04L 1/1822 |
| 2024/0008023 | A1* | 1/2024 | Yoon | H04W 72/0446 |
| 2024/0008025 | A1* | 1/2024 | Yoon | H04L 1/1896 |
| 2024/0039612 | A1* | 2/2024 | Jung | H04B 7/024 |
| 2024/0089744 | A1 | 3/2024 | Fujishiro et al. | |
| 2024/0138014 | A1* | 4/2024 | Jung | H04B 7/06964 |
| 2024/0243803 | A1* | 7/2024 | Echigo | H04B 7/1555 |
| 2024/0373312 | A1* | 11/2024 | Garcia | H04L 67/5681 |

FOREIGN PATENT DOCUMENTS

| | | | |
|---|---|---|---|
| CN | 111866726 | A | 10/2020 |
| CN | 111901014 | A | 11/2020 |
| CN | 111930052 | A | 11/2020 |
| CN | 112491773 | A | 3/2021 |
| CN | 112492512 | A | 3/2021 |
| WO | 2015188876 | A1 | 12/2015 |
| WO | 2020227414 | A1 | 11/2020 |
| WO | 2021095181 | A1 | 5/2021 |
| WO | 2021096225 | A1 | 5/2021 |
| WO | 2022249820 | A1 | 12/2022 |

OTHER PUBLICATIONS

Yan et al: "Passive Beamforming and Information Transfer Design for Reconfigurable Intelligent Surfaces Aided Multiuser MIMO Systems", IEEE Journal on Selected Areas in Communications, IEEE,US,vol. 38, No. 8, Jun. 13, 2020, pp. 1793-1808, XP011805734, ISSN: 0733-8716, DOI: 10.1109/JSAC.2020.3000811 (Year: 2020).*

Di Renzo, M., et al. "Reconfigurable Intelligent Surfaces vs. Relaying: Differences, Similarities, and Performance Comparison," IEEE Open Journal of the Communications Society, vol. 1, 2020, pp. 798-807.

Industrial Property Cooperation Center (IPCC). Search Report for JP Application No. 2023-574500 and English translation, mailed Oct. 22, 2024, pp. 1-41.

Japan Patent Office. Notice of Reasons for Refusal for JP Application No. 2023-574500 and English translation, mailed Oct. 28, 2024, pp. 1-13.

Liu, Y., et al. "Reconfigurable Intelligent Surfaces: Principles and Opportunities," IEEE Communications Surveys & Tutorials, vol. 23, No. 3, 2021, pp. 1546-1577.

International Searching Authority. International Search Report and Written Opinion for PCT Application No. PCT/CN2022/095991 and English translation, mailed Aug. 30, 2022, pp. 1-12.

European Patent Office. Partial Supplementary European Search Report for EP Application No. 22815229.4, mailed Oct. 9, 2025, pp. 1-19.

Samir, M., et al. "Optimizing Age of Information Through Aerial Reconfigurable Intelligent Surfaces: A Deep Reinforcement Learning Approach," IEEE Transactions on Vehicular Technology, vol. 70, No. 4, Apr. 2021, pp. 3978-3983.

Yan, W., et al. "Passive Beamforming and Information Transfer Design for Reconfigurable Intelligent Surfaces Aided Multiuser MIMO Systems," IEEE Journal on Selected Areas in Communications, vol. 38, No. 8, Aug. 2020, pp. 1793-1808.

European Patent Office. Extended European Search Report for EP Application No. 22815229.4, mailed Jan. 15, 2026, pp. 1-22.

Jung, M., et al. "Asymptotic Optimality of Reconfigurable Intelligent Surfaces: Passive Beamforming and Achievable Rate," 2020 IEEE International Conference on Communications (ICC), 2020, pp. 1-6.

Korean Intellectual Property Office. First Office Action for KR Application No. 10-2024-7000021 and English translation, mailed Feb. 12, 2026, pp. 1-12.

The State Intellectual Property Office of People's Republic Of China. First Office Action and Search Report for CN Application No. 202110620564.5 and English translation, mailed Jul. 1, 2026, pp. 1-14.

* cited by examiner

CONTROL METHOD AND APPARATUS FOR NETWORK NODE, AND COMPUTER-READABLE STORAGE MEDIUM

CROSS-REFERENCE TO RELATED APPLICATION

This application is a national stage filing under 35 U.S.C. § 371 of international application number PCT/CN2022/095991, filed May 30, 2022, which claims priority to Chinese patent application No. 202110620564.5 filed Jun. 3, 2021. The contents of these applications are incorporated herein by reference in their entireties.

TECHNICAL FIELD

The present disclosure relates to the technical field of reflecting intelligent surface (RIS), in particular to a method and a device for controlling a network node, and a computer-readable storage medium.

BACKGROUND

In the application of 5G New Radio (NR), signals can be transmitted through a millimeter wave spectrum to solve the problem of insufficient wireless spectrum. However, the propagation loss of millimeter wave spectrum is large, signals are susceptible to blockage, and communication between terminal devices and base stations can be greatly affected by the environment.

In order to solve the signal coverage problem of millimeter-wave spectrum communication, the industry introduced the Reflecting Intelligent Surface (RIS), or Intelligent Reflecting Surface (IRS) technology to enhance the coverage of millimeter-wave signals. However, traditional communication protocols and control methods are still applied to the control of RIS in the communication network, which cannot effectively control RIS and affect the network performance and coverage to some extent.

SUMMARY

The following is a summary of the subject matter described herein. This summary is not intended to limit the scope of protection of the claims.

Provided are a method and a device for controlling a network node, and a computer-readable storage medium in some embodiments of the present disclosure.

An embodiment of the present disclosure provides a method for controlling a network node, applied to the network node, the method may include, receiving a signaling sent by a base station, where the signaling is indicative of at least one of, an operating mode or a phase state of the network node; and regulating at least one of, the operating mode or the phase state of the network node according to the signaling.

An embodiment of the present disclosure provides a method for controlling a network node, applied to a base station, the method may include, determining at least one of, an operating mode, or a phase state of the network node; and sending a signaling that is indicative of at least one of, the operating mode, or the phase state of the network node.

An embodiment of the present disclosure further provides a device for controlling a network node, which may include at least one processor and a memory configured to communicate and connect with the at least one processor; where the memory stores an instruction that is executable by the at least one processor which, when executed by the at least one processor, causes the at least one processor to carry out any one of the methods as described above.

An embodiment of the present disclosure further provides a computer-readable storage medium storing thereon a computer-executable instruction which, when executed by a processor, causes the processor to carry out any one of the methods as described above.

Other features and advantages of the present disclosure will be illustrated in the following description, and in part will be apparent from the description, or may be understood by practicing the present disclosure. The objects and other advantages of the present disclosure can be achieved and obtained by the structure particularly set forth in the description, claims, and drawings.

BRIEF DESCRIPTION OF DRAWINGS

The drawings are intended to provide a further understanding of the technical scheme of the present disclosure, and constitute a part of the specification, and they are intended to illustrate the technical scheme of the present disclosure in conjunction with the embodiments of the present disclosure, but are not intended to limit the technical scheme of the present disclosure.

DETAILED DESCRIPTION

The purpose, technical scheme, and advantages of the present disclosure will become apparent through the following description for various embodiments in conjunction with the drawings. It should be understood that the embodiments described here are intended for illustration but not limitation to the present disclosure.

Figure 1:
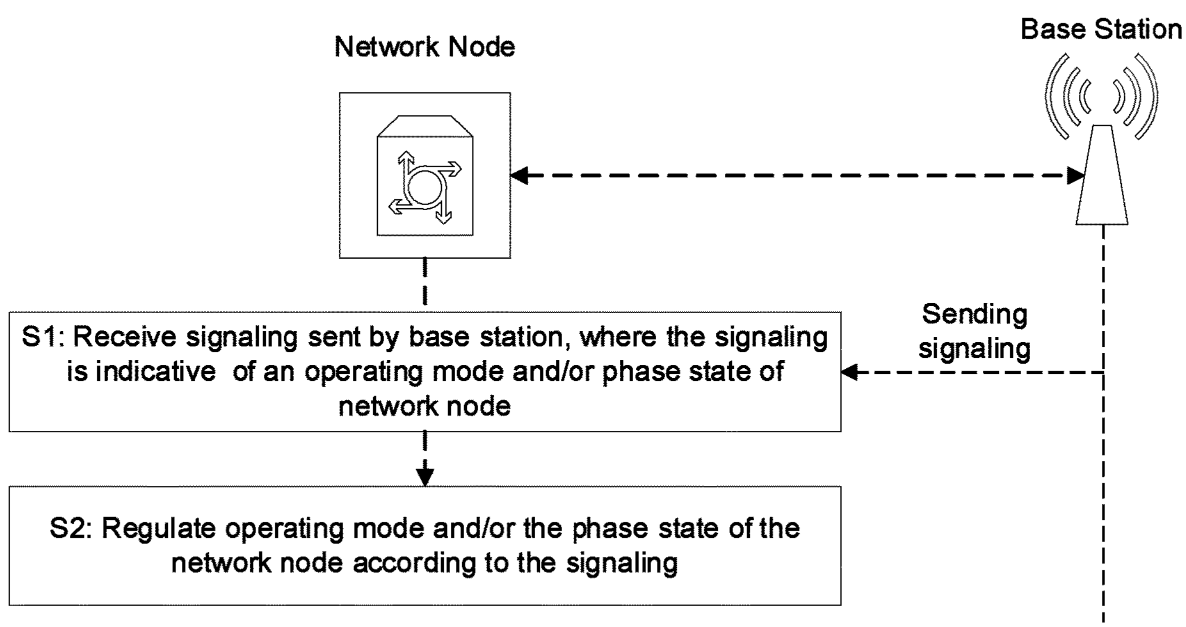
FIG. 1 depicts a flowchart showing a method for controlling at a network node side according to an embodiment of the present disclosure.

In order to better help the base station control the access of novel equipment, an embodiment of the present disclosure provides a method for controlling a network node, which is applied to the network node. Referring to FIG. 1, the method includes but is not limited to the following operations S1 and S2.

At S1, a signaling sent by a base station is received, where the signaling is indicative of an operating mode and/or phase state of a network node.

At S2, the operating mode and/or the phase state of the network node is adjusted according to the signaling.

In some embodiments, the network node can be different types of equipment other than the user equipment (UE), such as reflecting intelligent surface (RIS) or other phase regulation equipment with phase regulation function, or equipment for regulating operating mode according to signaling, etc.

Reflecting intelligent surface RIS (or intelligent reflecting surface, IRS) is a new concept introduced by the wireless communication industry. By setting a two-dimensional artificial surface of electromagnetic material on the surface, such as a super surface, the electromagnetic properties of electromagnetic signals incident on the surface are readjusted, thus significantly improving the performance of wireless communication networks, and helping 5G networks solve the problems of hardware cost and maintenance cost caused by dense deployment of micro base stations or access points.

In particular, a large number of reflective units are arranged over the surface of RIS. The reflective units form a plane, with each unit independently inducing the amplitude and/or phase change of the incident electromagnetic frequency signal, so RIS can also be called a reconfigurable intelligent surface, in terms of beam reconstruction. These reflective units have special electromagnetic characteristics depending upon their structural parameters, and can be controlled by the RIS controller in a software-defined manner. Through the joint phase control of the reflective units by the RIS controller, fine three-dimensional reflection beamforming can be realized cooperatively. In particular, the reflected electromagnetic signals can be coherently superposed to improve the received signal power, or can be cancelled to reduce interference. By deploying RIS in environments such as those painted on building walls and carried by airborne platforms, RIS can transform radio environments into smart spaces that can aid in information sensing, analog computing, and wireless communications.

The control of RIS is currently limited by traditional communication protocols and control schemes, and it is inefficient to achieve good synergy with base stations in some scenarios, which causes some challenges in the popularization and application of the RIS. In view of this, some embodiments of the present disclosure provide a method and a device for controlling a network node, and a computer-readable storage medium. A first scrambling code dedicated to RIS equipment is added to a communication protocol, and scrambling and descrambling are performed based on the first scrambling code to ensure better cooperation between RIS equipment and a base station.

Figure 2:
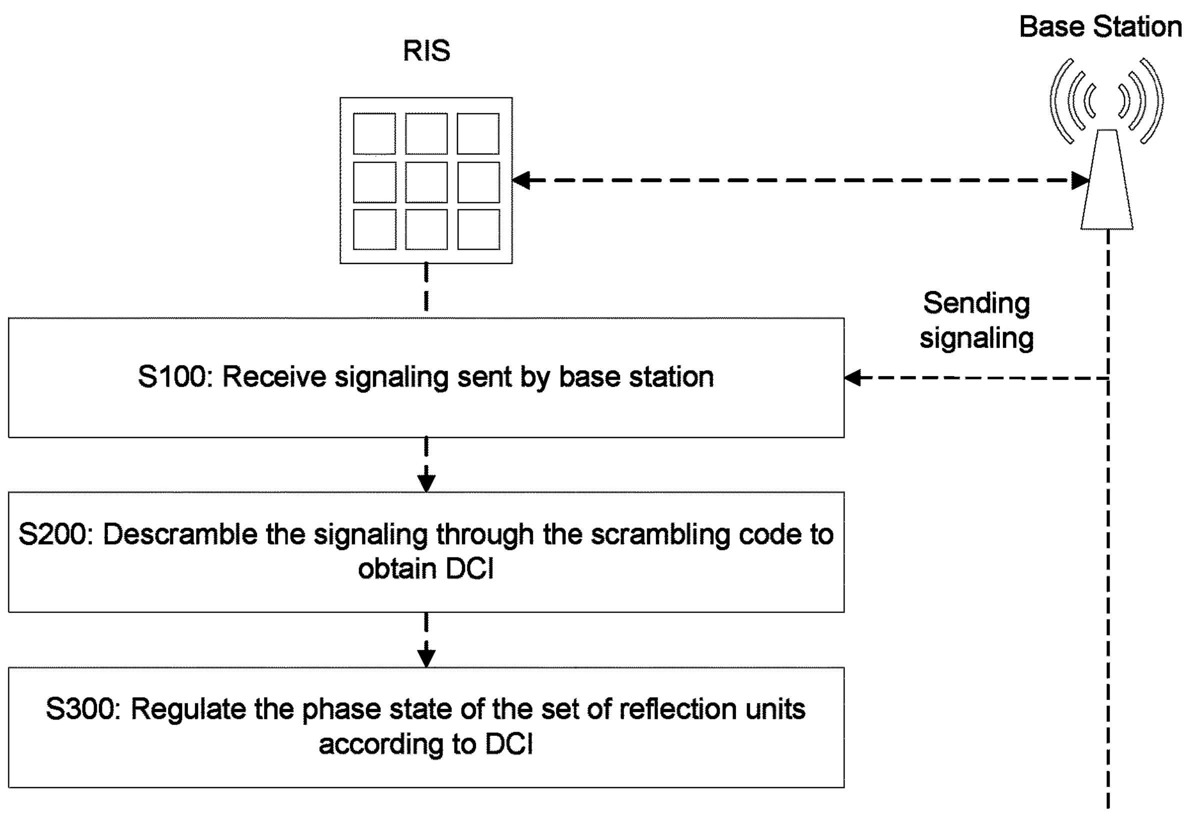
FIG. 2 depicts a flowchart showing a method for controlling RIS based on phase state control according to an embodiment of the present disclosure.

Referring to FIG. 2, an embodiment of the present disclosure provides a method for controlling a network node, which is applied to a reflecting intelligent surface (RIS) arranging thereon a plurality of sets of reflective units. Each set of reflective units includes at least one reflective unit. The method includes but is not limited to the following operations S100, S200, and S300.

At S100, a signaling sent by a base station is received, where the signaling includes downlink control information (DCI) that is indicative of a phase state of a set of reflection units, and the DCI is scrambled by the base station through a scrambling code.

At S200, the signaling is descrambled by the scrambling code to obtain DCI.

At S300, the phase state of the set of reflective units is adjusted according to DCI.

Downlink Control Information (DCI), which is carried by the downlink control channel, is information sent by the base station to the terminal device. The DCI includes resource allocation schemes, retransmission requests and power controls, etc. In different interaction stages between the base station and the terminal device, DCI with different formats and corresponding downlink control channels can ensure smooth communication between the base station and the terminal device. In the application scenario of RIS, RIS can be deployed as relay equipment or a terminal device, with two different access schemes adopting different signaling mechanisms. When being deployed as relay equipment, the RIS adopts the signaling architecture related to conventional relay equipment. In this case, the RIS signaling architecture will not conflict with the signaling architecture of User Equipment (UE), so it will not be detailed here. When being deployed as a terminal device, RIS adopts signaling architecture related to UE. However, there are often multiple UEs in the serving cell of the base station. In such a case, the RIS and the UEs have identical access and interaction with the base station, such that the base station adopts UE-related signaling architecture to control the RIS. As such, the RIS is not fully utilized. Therefore, it is important to address the issues regarding how to identify RIS by a communication network, how to control RIS by a communication network, and how to control the content that RIS feeds back to the communication network.

In this respect, an additional scrambling code is appended to the signaling architecture for controlling RIS in the communication protocol, in an embodiment of the present disclosure. The base station is enabled to indicate through the scrambling code dedicated to RIS, as to whether the DCI sent by the base station is a DCI for RIS equipment or a DCI for ordinary UE, as the base station is issuing the DCI indication. For example, the scrambling code is represented by the first scrambling code. When the RIS equipment accesses the serving cell of the base station, it is determined that the base station and the RIS equipment employ the first scrambling code to scramble and descramble through the random-access preamble. In this case, the base station scrambles the downlink channel of the DCI with the first scrambling code before sending the signaling. Since each of the UEs in the serving cell does not have the first scrambling code, the UEs cannot successfully descramble the signaling even if the UEs receive the signaling. After receiving the signaling, RIS equipment can successfully descramble it through the first scrambling code to obtain DCI, which ensures that RIS can accurately identify the signaling sent by the base station without being interfered by UE-related messages.

It can be understood that the newly appended scrambling code is not limited to the first scrambling code, but the newly appended scrambling code can also include a second scrambling code, a third scrambling code, etc. These scrambling codes are all dedicated to the RIS equipment and can only be descrambled by the same scrambling code in the RIS equipment. In the preamble stage of random access, RIS equipment and the base station shall make an agreement on the type of scrambling code adopted by both sides.

The existing DCI scrambling and descrambling adopt Radio Network Temporary Identity (RNTI). Depending upon different functions, various RNTIs are set for UE under the existing communication protocol, including, for example, SI-RNTI (for system messages), RA-RNTI (for random access response), C-RNTI (for user services), etc. Different types of RNTIs have different value ranges, and different types of RNTIs each has a respective mapping relationship with a channel. By scrambling the control message of the channel with RNTI, the functions of system broadcasting and particular user scheduling can be realized. As a consequence, in an embodiment of the present disclosure, the newly appended scrambling code can be realized by RNTI. For example, the newly appended scrambling code is set as RIS-RNTI 1 (first RIS-specific scrambling code), RIS-RNTI 2 (second RIS-specific scrambling code), RIS-RNTI 3 (third RIS-specific scrambling code), and so on, and which are hereinafter collectively referred to as RIS-RNTI. Therefore, it can be seen that the range of values of RIS-RNTI is different from that of all RNTI in the current communication protocol, so as to distinguish between RIS equipment and UE equipment, distinguish specific wireless channels, and so on.

It can be understood that at S100, the base station may send the signaling through a Physical Downlink Control Channel (PDCCH) or a Physical Downlink Shared Channel (PDSCH). In this case, a mapping relationship is presented between RIS-RNTI and the PDCCH or PDSCH. For example, the DCI indication is sent to RIS through RIS-RNTI scrambled PDCCH, and the RIS descrambles the PDCCH to restore DCI to get corresponding control instructions.

Generally, the signaling received by RIS is sent after the base station scrambles the corresponding channel through the scrambling code. RIS performs descrambling based on the same scrambling code, and realizes the successful access of RIS as a terminal device in the serving cell. It is worth noting that although the above-mentioned dedicated scrambling codes are employed to distinguish between RIS and UE, some general scrambling codes can also be employed to scramble the signaling that indicates the RIS. The present disclosure is not limited thereto.

Through the scrambling code in the above S100, the RIS equipment descrambles the corresponding channel so as to locate the location of DCI in the signaling. DCI contains fields for controlling the reflective units on RIS, depending upon the currently adopted format. Instructions executable by the RIS controller can be generated by extracting these fields.

The RIS controller can control each reflective unit or set of reflective units on the RIS surface individually according to the signaling. It can be understood that currently applied reflective units have different structures, which are of digitally controllable two-dimensional materials typically. For example, the reflective unit may be a PIN diode, a field effect transistor, a Micro-Electro-Mechanical System (MEMS) switch, or the like. For different types of reflective units, the RIS control has different control schemes. For example, for the PIN diode, the switching state is switched and controlled by a set bias voltage, which is equivalent to the switching between two phase states, thereby generating a phase-shift difference, and realizing the phase reconstruction of the electromagnetic frequency. Since the basic functions to be realized by the reflective units are substantially identical, it is not intended to elaborate on which type of control can be made to the reflective units herein. Those having ordinary skills in the art can conceive corresponding control methods according to the properties of the adopted reflective units.

As such, through the above operations, RIS can effectively descramble the received signaling, so as to better cooperate with the base station, help the base station to enhance the signal coverage and network performance, and enhance the cell multiplexing capacity.

In some cases, the set of reflective units on the RIS equipment supports different operating modes, so that the RIS equipment can be switched to different operating modes as a whole, such as reflection mode, transmission mode, active mode, and passive mode. For example, in the reflection mode, the set of reflective units reflect the incident electromagnetic frequency towards a specified direction, and adjusts the reflected electromagnetic frequency on the reflective surface through phase shift, so as to jointly generate another beam. The selection of the operating mode can be achieved in many ways, which are illustrated by two examples below.

Figure 3:
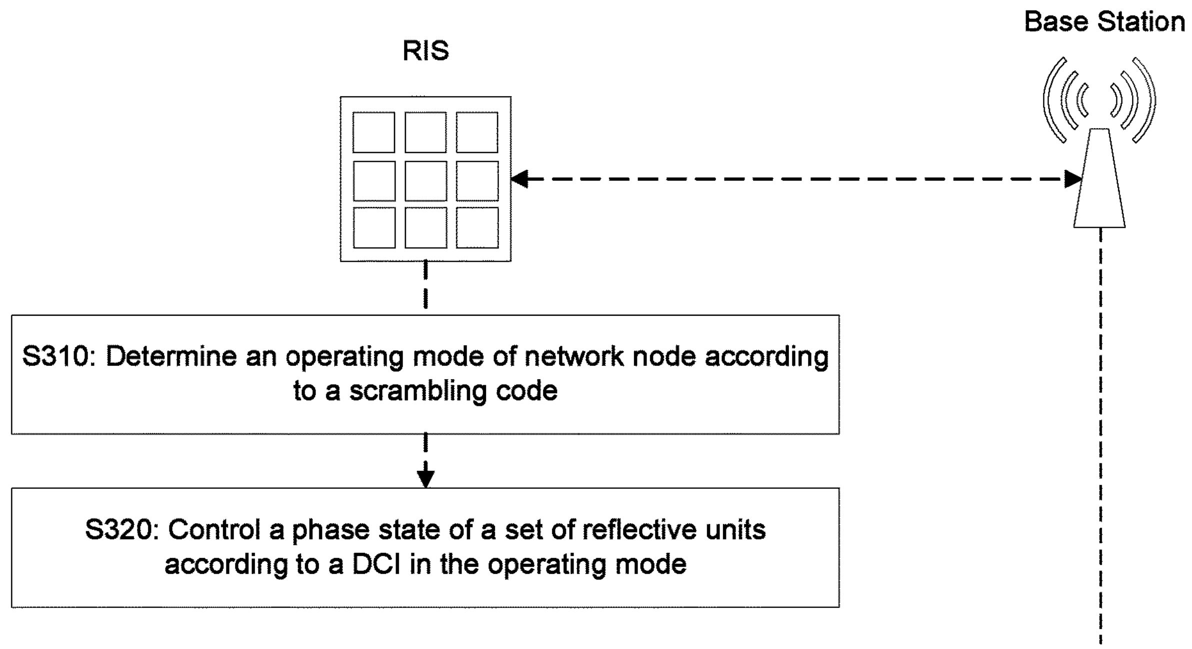
FIG. 3 depicts a flowchart showing the determination of an operating mode according to RIS-RNTI according to an embodiment of the present disclosure.

FIG. 3 depicts a first example embodiment which is related to the determination of the operating mode to be adopted by a network node through the type of scrambling code. That is, different types of scrambling codes each corresponds to a respective operating mode. The following operations S310 to S320 are included.

At S310, an operating mode of a network node is determined according to a scrambling code.

At S320, a phase state of a set of reflective units is controlled according to a DCI in the operating mode.

The above operations are illustrated by way of an example where the network node is a RIS equipment. When the base station determines to scramble with the first scrambling code, it is determined that the descrambling with the first scrambling code is successful when the downlink channel (e.g., the PDCCH) is subjected to a blind decode at the side of the RIS equipment. In this case, the RIS equipment looks up the correspondence table between the types of scrambling code and the operating modes and knows that the first scrambling code corresponds to the first operating mode (e.g., a reflecting mode). Then the RIS controller sets all RIS equipment into the first operating mode, and performs phase state regulation to individual reflective units or the set of reflective units in the first operating mode according to DCI.

It can be understood that the first operating mode does not conflict with the phase state regulation of the set of reflective units. Taking the reflecting mode as an example, the reflecting mode only indicates that the set of reflective units is in the reflecting state and does not indicate at what phase shift angle the set of reflective units rotates. Thus, the phase state of the set of reflective units can still be regulated based on the reflecting mode to determine the waveform characteristics of the reflected beam.

Figure 4:
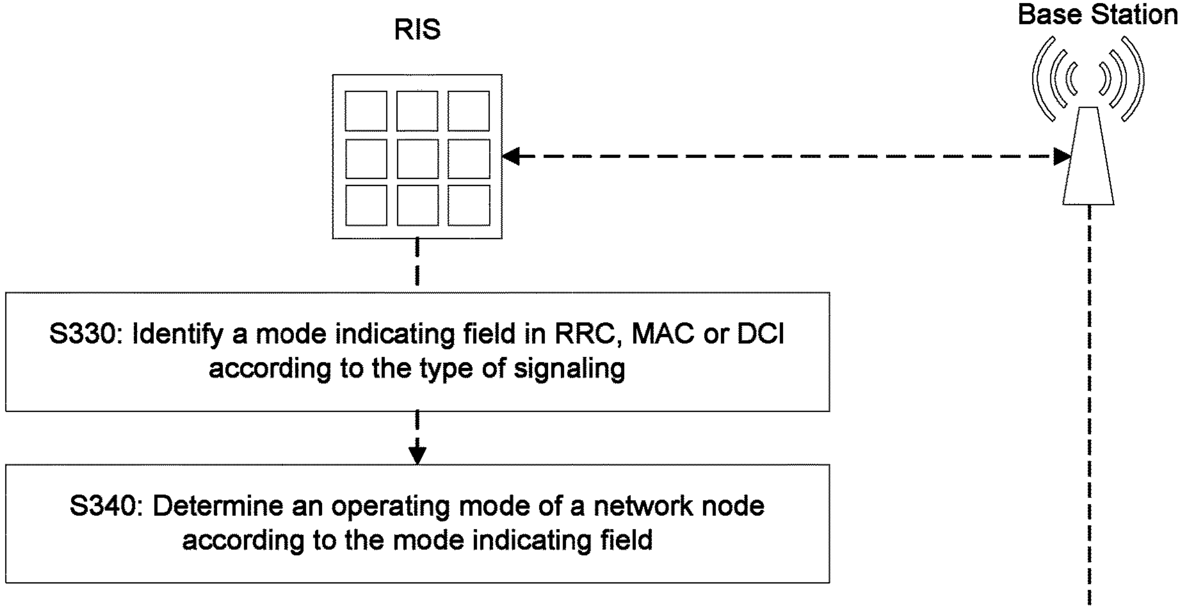
FIG. 4 depicts a flowchart showing the determination of an operating mode according to a mode-indicating field according to an embodiment of the present disclosure.

FIG. 4 depicts a second example embodiment which is related to the determination of the operating mode to be adopted by a network node through a particular field in a signaling, such as the mode indicating field configured in Radio Resource Control (RRC), medium access control (MAC) or DCI, and each value in the mode indicating field corresponds to a respective one of the operating mode. The following operations S330 to S340 are included.

At S330, a mode indicating field in RRC, MAC, or DCI is identified according to the type of signaling.

At S340, an operating mode of a network node is determined according to the mode indicating field.

In the case of the mode indicating field in DCI, when the RIS equipment is successfully descrambled by scrambling code, each bit in DCI can be located, so as to determine the value of the bit corresponding to the mode indicating field in the DCI, and the corresponding relationship between the value and the operating mode is found, such that the particular operating mode that RIS equipment is to be operated in is determined. It can be understood that in the case that the mode-indicating field in DCI is set in binary, the length of bits of the mode-indicating field is log 2(K) when the RIS equipment has K operating modes. For example, the RIS has four operating modes, namely the first to fourth operating modes, and the mode indicating field is represented by two bits, namely 00, 01, 10, and 11. When the value of the mode indicating field is determined to be 00 after descrambling, it is determined that the operating mode to be adopted by the RIS is the first operating mode. For a similar reason discussed above, the current operating mode does not conflict with the phase state regulation performed by the set of reflective units, which will not be repeated here.

Figure 5:
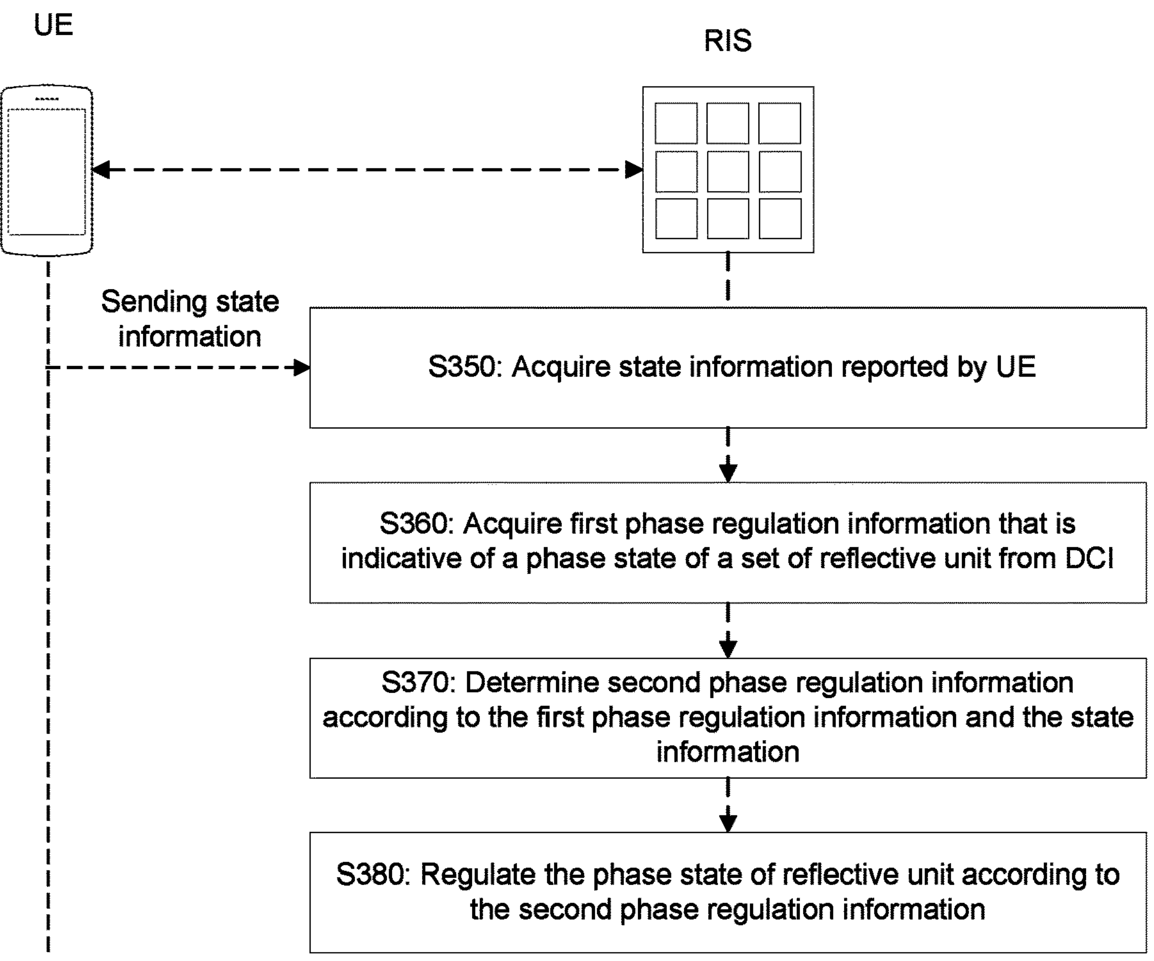
FIG. 5 depicts a flowchart showing the determination of an accurate beam based on a rough beam according to an embodiment of the present disclosure.

It can be understood that since a reflective unit has different phase states, the control of the phase states of the set of reflective units by control instructions takes up some bits in the DCI. When the number of reflective units or sets of reflective units on the RIS is large and multiple phase states are supported by reflective units, the control instructions will occupy a considerable number of bits, thus the signaling overhead will be great. Taking a reflective unit supporting two phase states as an example, if the RIS panel is composed of 64×64 reflective units and the bits are set in binary, the total number of controllable phases is 2^(64×64), such that the signaling overhead is very huge, which affects the signaling transmission. Therefore, in order to reduce the signaling overhead, a method for controlling a phase state is proposed with respect to operation S300. Referring to FIG. 5, the method includes operations S350 to S380.

At S350, state information reported by a user equipment is acquired, the state information includes location information and/or channel state information of the user equipment.

At S360, first phase regulation information that is indicative of a phase state of a set of reflective units is acquired from a DCI.

At S370, second phase regulation information is determined according to the first phase regulation information and the state information.

At S380, the phase state of a reflective unit is regulated according to the second phase regulation information.

Through operations S350 to S380 above, the base station indicates a rough phase of the RIS panel by limited bits in signaling only, to acquire an approximate beam. Based on the approximate beam provided by the base station, RIS calculates an accurate beam directed at the UE based on the location information and/or channel state information (CSI) reported by the UE, and improves the strength of signals received by the UE. In particular, in order to reduce the signaling overhead, the base station limits the length of bits of the field for controlling the phase state in DCI, so after receiving the first phase regulation information in DCI, RIS can only get a rough coverage according to the first phase regulation information. The rough coverage can cover the target UE but cannot provide the target UE with sufficiently strong signal strength. Thus, the RIS needs to perform a further calculation to acquire an accurate beam to be directed at the target UE. In an embodiment of the present disclosure, the RIS obtains the state parameters reported by the target UE, including the current position information of the target UE and at least one parameter in CSI. The RIS controller performs a further calculation and acquires the second phase regulation information according to the first phase regulation information and the state parameters, so as to obtain an accurate beam to be directed at the target UE. Thereby, the strength of the signal received by the target UE is enhanced. Through the above method, the signaling overhead of signaling sent by the base station can be reduced, and the speed and timeliness of interaction between the base station and the RIS can be improved.

In some cases, in addition to the interaction among the base station, RIS, and UE, a control center can be arranged in the communication network. The control center is connected with the RIS and provides additional control instructions for the RIS. For example, the RIS can receive the instructions from the control center by receiving the regulation instructions sent by the control center, to regulate the operating state or operating mode of the RIS according to the regulation instructions; or, by receiving the third phase regulation information sent by the control center to regulate the phase state of the set of reflective units according to the third phase regulation information. The third phase regulation information may be sent by the base station to the control center. Alternatively, the third phase regulation information may be acquired according to the state information reported by the user equipment to the control center. Alternatively, the third phase regulation information may be acquired according to the state information of the user equipment reported by the network node to the control center.

The regulation instruction is employed to generally regulate the operating state of the RIS. For example, when the control center is connected with multiple RIS, the control center can know the UE that each RIS is currently directed at and the current operating state of each RIS. When two or more RIS are directed at the same UE, the signal strength is excessively high. In order to avoid the influence of the utilization of the communication network by other UE, the control center can send the regulation instruction to the RIS so that only one RIS is directed at one UE. For another example, when one RIS fails, the control center instructs another RIS to be directed at the UE that needs service. For another example, for active RIS equipment, when the RIS equipment is in an idle state for a certain period of time, the RIS equipment can be set to a hibernation state through a regulation instruction to reduce the power consumption of the communication network. It is apparent that, a regulation instruction typically does not involve the phase state regulation of a particular reflective unit, so the RIS can receive the regulation instructions along with the phase regulation information from the base station.

In addition to the above regulation instructions, the control center can also directly send third phase regulation information to the RIS. In this case, the control center can be connected with the RIS controller through a wired connection, which is suitable for the transmission of a large amount of data. As such, the third phase regulation information can directly indicate an accurate beam, thus directly determining the alignment direction of the RIS. It can be understood that both the control center and the base station can provide phase regulation information for RIS, and the control center and the base station cooperate with each other to achieve better network cooperation.

In order to allow the control center to better control the operation of RIS according to the practical situation, RIS reports its own operating parameters when accessing the communication network. The operating parameters include at least one of, a panel aperture, a density of reflective units, a frequency characteristic, information on reciprocity characteristics, a degree of difference in each direction, an adjustable angular interval, a panel partitioning strategy, a number of physical arrays, a number of virtual reflective units, and a supported operating mode.

Figure 6:
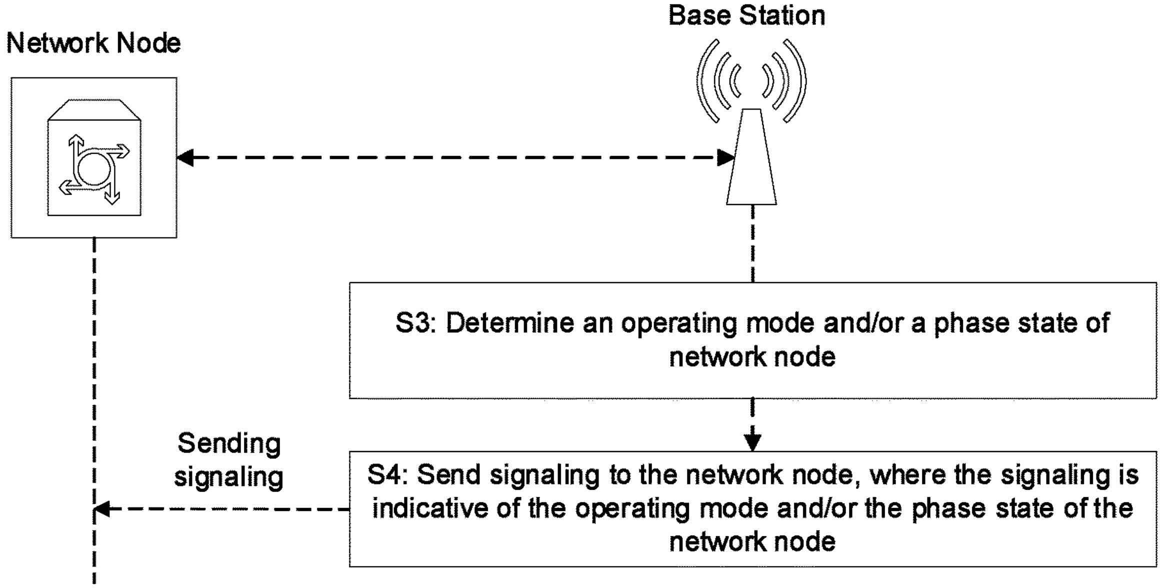
FIG. 6 depicts a flowchart showing a method for controlling at the base station side according to an embodiment of the present disclosure.

Referring to FIG. 6, with respect to the method for controlling a network node in operations S1 and S2, the cooperation of the base station side with respect to the method is also required. Thus, an embodiment of the present disclosure provides a method for controlling a network node, which is applied to a base station. The method includes but is not limited to the following operations S3 and S4.

At S3, an operating mode and/or a phase state of a network node is determined.

At S4, signaling is sent to the network node, and the signaling is indicative of the operating mode and/or the phase state of the network node.

Similarly, the network node can be different types of equipment other than the user equipment (UE), such as reflecting intelligent surface (RIS) or other phase regulation equipment with phase regulation function, or equipment for regulating operating mode according to signaling, etc.

Figure 7:
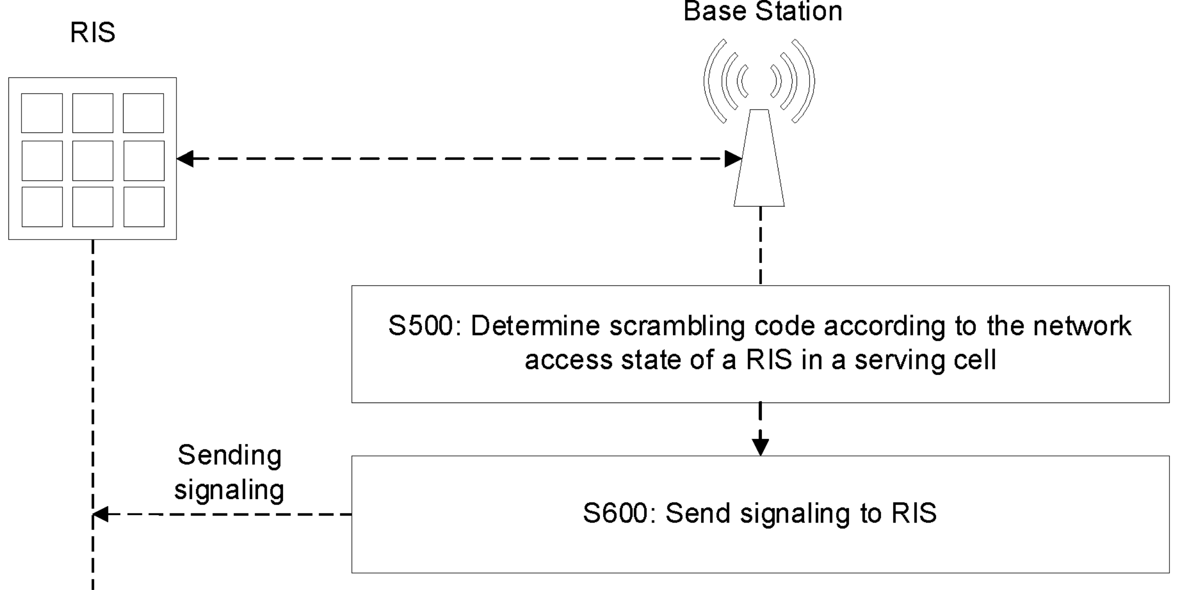
FIG. 7 depicts a flowchart showing a method for controlling RIS according to an embodiment of the present disclosure.

Referring to FIG. 7, an embodiment of the present disclosure provides a method for controlling a network node, which is applied to a base station connected with a RIS arranging thereon a plurality of sets of reflective units. Each set of reflective units includes at least one reflective unit. The method includes but is not limited to the following operations S500 and S600.

At S500, a scrambling code is determined according to the network access state of a network node in a serving cell.

At S600, signaling is sent to a network node, where the signaling includes downlink control information DCI that is indicative of a phase state of a set of reflective units, and the DCI is scrambled by the scrambling code.

At the base station side, when the random-access preamble is received from the RIS, the type of scrambling code to be employed is determined by negotiation with the RIS based on the network access state of the RIS in the current serving cell. This scrambling code is a scrambling code of a new type, and which is intended to distinguish between the RIS equipment and ordinary UEs, and is a scrambling code dedicated to the RIS equipment. Then the signaling is sent after the downlink channel of the DCI is scrambled through the scrambling code. The UEs in the serving cell cannot successfully descramble the signaling even if they receive the signaling since they do not have the scrambling code, while the RIS equipment can successfully descramble to obtain the DCI through the scrambling code after receiving the signaling. Thus, it is ensured that the RIS can accurately identify the signaling sent by the base station without being interfered by the UE-related messages.

The network access state of RIS includes frequency domain and time domain information selected by RIS during random access, and the type of scrambling code adopted between the base station and RIS is determined during the random-access response. In an embodiment of the present disclosure, it is determined that the first scrambling code is adopted between the base station and the RIS to scramble and descramble the signaling. Similarly, the first scrambling code can be RNTI, which is denoted as RIS-RNTI, and a plurality of RIS-RNTIs can be set. It is worth noting that although the above-mentioned dedicated scrambling codes are employed to distinguish between RIS and UE, some general scrambling codes can also be employed to scramble the signaling that indicates the RIS. The present disclosure is not limited thereto.

Since operations S500 and S600 actually correspond to the above operations S100 to S300, in order to avoid repetition, please refer to the descriptions regarding operations S100 to S300.

When RIS equipment joins the serving cell of a base station as a terminal device, the RIS reports the corresponding information to the base station during random access, so that the base station can identify that it is a RIS equipment rather than a UE. For example, referring to FIG. 8, the reporting of equipment types can be implemented through the following operation S400.

At S400, the accessing entity is determined to be RIS equipment according to UE capability information reported by the RIS, in response to an access to a base station by the RIS.

UE capability is an important link in the coordination between the base station and the UE. If the UE indicates its supported function to the base station through UE capability information, then the base station can configure this function for the UE. If the UE does not support a certain function, then the base station would not configure the function for the UE. The RIS that accesses the base station as a terminal device, also reports the function to the base station through UE capability information. Based on the signaling structure of UE capability information, the base station can determine that the currently accessing entity is RIS equipment.

Based on the above signaling overhead requirements, it can be seen that it is not suitable to carry phase regulation information of excessive length in signaling. Thus, it is necessary to reduce the number of bits occupied by the phase regulation information. Therefore, different approaches are needed to reduce the signaling overhead of the phase regulation information at the base station side. The following two example embodiments are illustrated for the implementation of the reduction of signaling overhead.

Figure 9:
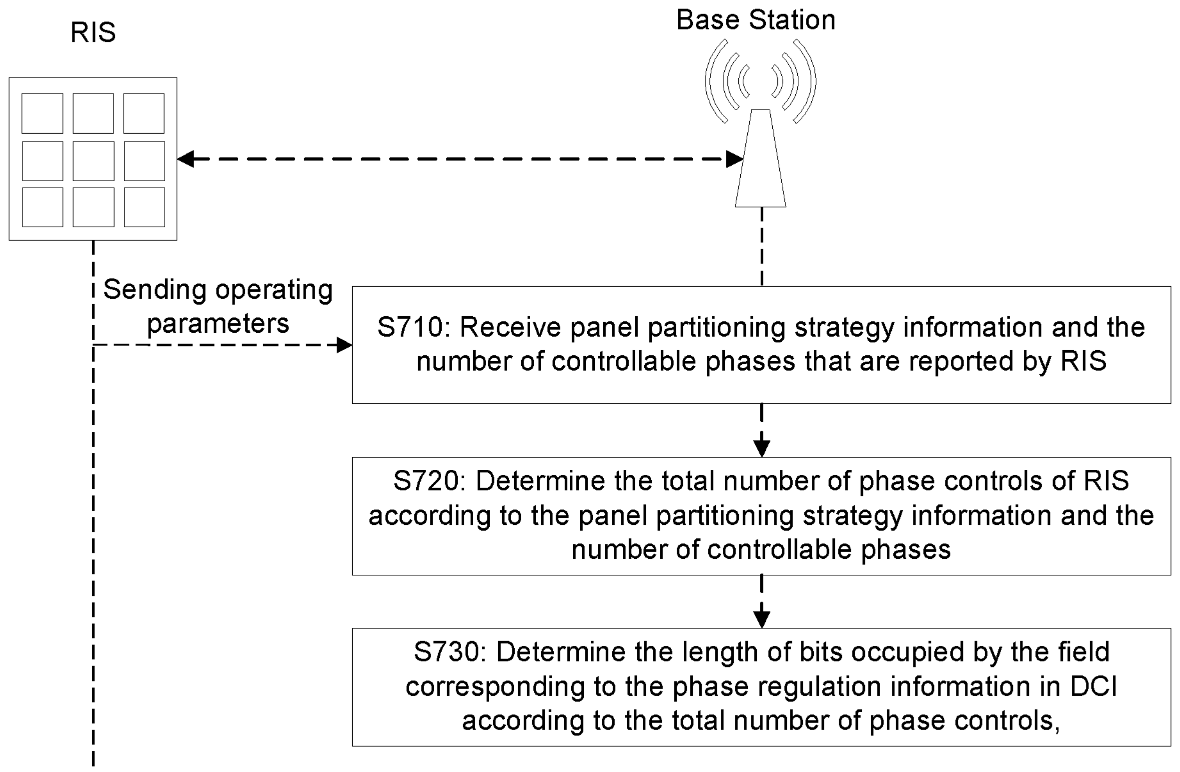
FIG. 9 depicts a flowchart of a method for determination of the length of bits occupied by phase regulation information based on a partitioning strategy according to an embodiment of the present disclosure.

The first example embodiment is based on the panel partitioning strategy information of RIS, the management of the RIS with a large number of reflective units is simplified, thus reducing the signaling overhead of phase regulation information. FIG. 9 depicts S710 to S730.

At S710, panel partitioning strategy information and the number of controllable phases that are reported by RIS are received, where the panel partitioning strategy information is indicative of the grouping of the reflective units, and the number of controllable phases is the number of phase states supported by the reflective units.

At S720, the total number of phase controls of RIS is determined according to the panel partitioning strategy information and the number of controllable phases.

At S730, the length of bits occupied by the field corresponding to the phase regulation information in DCI is determined according to the total number of phase controls, where the phase regulation information is indicative of a phase state of a reflective unit.

The operating parameters of RIS can include panel partitioning strategy information and number of controllable phases, in which the panel partitioning strategy information is indicative of the grouping of reflective units on RIS. For RIS having such as a 64×64 reflective unit array, the array may be divided into four sub-blocks according to a predefined rule, and each sub-block includes 4×4 reflective units, so the reflective units on the RIS panel are divided into 16×16 sub-blocks. The signaling overhead is reduced by uniformly controlling the phase state of the sub-blocks. The number of controllable phases is indicative of the number of phase states supported by each reflective unit. Based on the above-mentioned grouping situation, the total number of phase controls of RIS can be obtained in conjunction with the number of phase states supported by reflection units, so as to determine the length of bits occupied by phase regulation information.

It is worth noting that although the above-mentioned partitioning control strategy reduces the number of controllable phases, it is still different from the strategy of deactivating some reflective units to reduce signaling overhead. For example, some reflective units are deactivated, with 16×16 reflection units left activated on the surface of RIS. In this case, when the base station is directed at RIS according to the original beam width, some beams are not reflected, due to the reduction in the reflective area of RIS. This would probably lead to a deviation of the reconstructed beams of RIS from the desired reconstruction. The partitioning control strategy can flexibly adjust the total number of phase controls while keeping the reflective area of RIS unchanged, and can adapt to the rapidly changing communication network environment.

Figure 10:
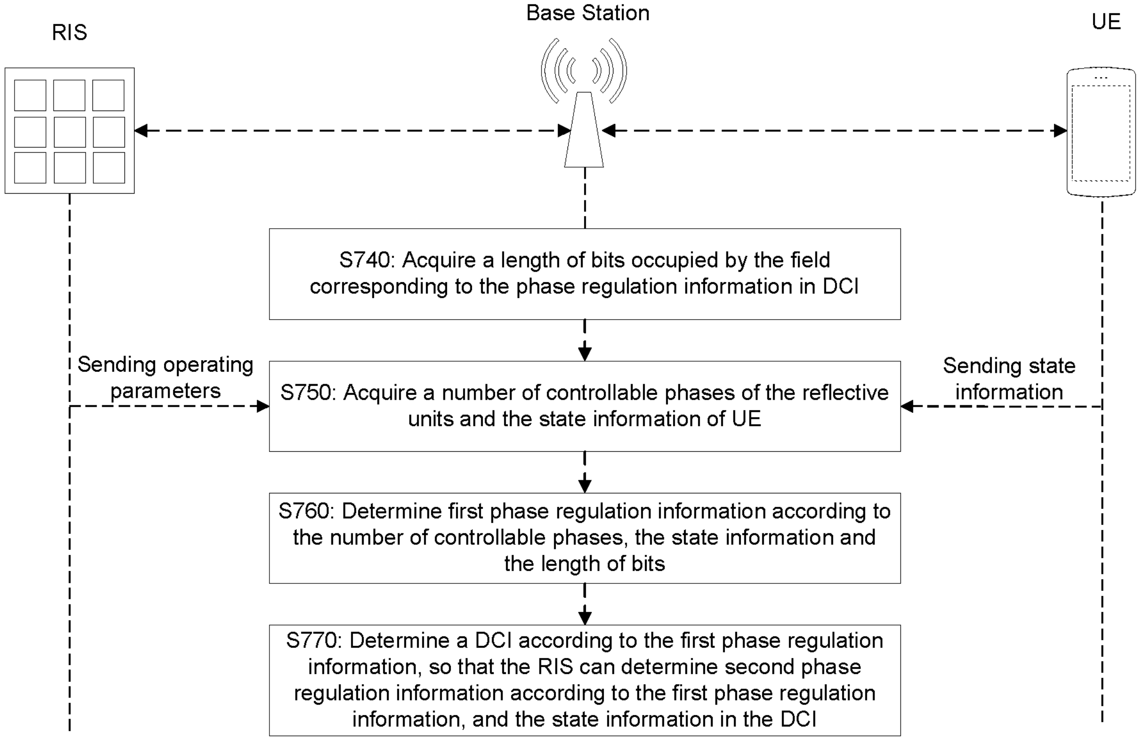
FIG. 10 depicts a flowchart showing the determination of phase regulation information based on length of bits limitation according to an embodiment of the present disclosure.

The second example embodiment describes that the calculation result of the rough beam is provided by the base station, and the accurate beam is calculated by RIS. It can be understood that although the base station can calculate an accurate beam according to the existing parameters, it is only possible to calculate a rough beam first and then send the result to the RIS for subsequent processing. In this case, the calculation of the rough beam at the base station side can be implemented according to the following operations S740 to S770, as shown in FIG. 10.

At S740, a length of bits occupied by the field corresponding to the phase regulation information in DCI is acquired, where the phase regulation information is indicative of a phase state of a set of reflective units.

At S750, a number of controllable phases of the reflective units and the state information of a UE are acquired, where the number of controllable phases is the number of phase states supported by the reflective units, and the state information includes the location information and/or channel state information of the UE.

At S760, first phase regulation information is determined according to the number of controllable phases, the state information, and the length of bits.

At S770, a DCI is determined according to the first phase regulation information, so that the RIS can determine second phase regulation information according to the first phase regulation information, and the state information in the DCI.

In this example, due to the limitation of the length of bits occupied by the field corresponding to the phase regulation information, the base station needs to calculate the phase regulation information based on the length of bits. On the basis of not exceeding the length of bits, the rough beam is calculated by means of the number of controllable phases of the reflective units and the state information of the UE, then the first phase regulation information is determined, and the corresponding bit position is set according to the first phase regulation information.

After receiving the first phase regulation information, the RIS calculates an accurate beam based on the rough beam according to the state information reported by the UE to the RIS, thereby improving the signal strength provided by the RIS to the UE.

Through the above operations described in an embodiment of the present disclosure, a communication standard is provided for RIS equipment, and a dedicated DCI scrambling code, namely the first scrambling code, is appended to the protocol to help the base station distinguish RIS equipment from ordinary user equipment. Since the first scrambling code is different from the scrambling code employed by the user equipment, when the base station sends the DCI indication, the user equipment can be prevented from erroneously descrambling signaling through the first scrambling code. It is ensured that the RIS equipment can correctly receive the DCI indication from the base station by means of the first scrambling code, so that the base station and the RIS equipment can better coordinate with each other, thus helping the base station to enhance the signal coverage and network performance, and improving the cell multiplexing capacity.

The method for controlling a network node according to an embodiment of the present disclosure will be illustrated with a practical example below.

The scenario of this example includes a base station, a RIS and a UE, where the RIS equipment accesses the serving cell of the base station as a terminal device, adjusts a beam incident from the base station onto the RIS surface through a reflective unit or a set of reflective units arranged thereon, reconstructs the beam and transmits the reconstructed beam to the UE.

Figure 11:
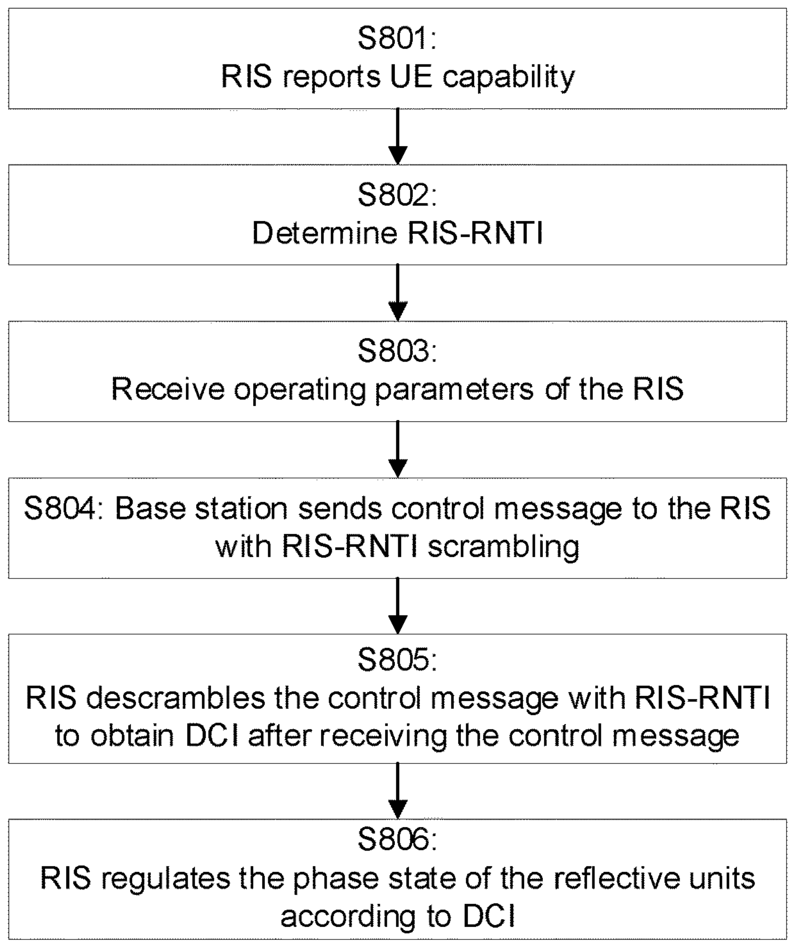
FIG. 11 depicts a flowchart according to an embodiment of the present disclosure.

Referring to FIG. 11, in order to ensure the normal operation of the RIS, the overall control method between the base station and the RIS set forth in this example includes the following operations S801 to S806.

At S801, RIS reports UE capability. The RIS reports UE capability information to the base station when accessing the base station, so that the base station can determine that the currently accessing entity is RIS.

At S802, RIS-RNTI is determined. A negotiation between the RIS and the base station is held during a random-access procedure, it is determined that the RIS-RNTI is adopted for the scrambling and descrambling of the DCI indication, where the range of values of the RIS-RNTI is not identical to the range of values of any type of the RNTI adopted by the UE.

At S803, operating parameters of the RIS are received. The RIS reports its own operating parameters, which include at least one of, a panel aperture, a density of reflective units, a frequency characteristic, information on reciprocity characteristics, a degree of difference in each direction, an adjustable angular interval, a panel partitioning strategy, a number of physical arrays, a number of virtual reflective units, and a supported operating mode. The RIS can report the operating parameters directly or through a control center to the base station.

At S804, the base station sends signaling to the RIS with RIS-RNTI scrambling: phase regulation information of the reflective units is determined according to the current operating situation of the RIS, the field of DCI is determined in the signaling according to the phase regulation information, and the DCI is scrambled through the RIS-RNTI and is then sent through the PDCCH.

At S805, after receiving the signaling, RIS descrambles the signaling with RIS-RNTI to obtain DCI. RIS receives the signaling sent by the base station through the PDCCH, and the RIS performs a blind detection on the PDCCH and determines that the descrambling with RIS-RNTI is successful, and reads the phase regulation information in the DCI.

At S806, RIS regulates the phase state of the reflective units according to DCI.

Based on the above operations in this example, RIS equipment and UE devices are distinguished by RIS-RNTI, so that the control of RIS can be optimized based on DCI format, specific fields, and the like, and good cooperation between the base station and RIS can be realized, thus improving the network performance.

In the control process, different control strategies are adopted to solve different issues of interaction. Regarding the control of the operating mode, the operating mode of the RIS can be indicated through the PDCCH or PDSCH, including the following aspects (i) and (ii), for example.

a. Different operating modes are distinguished by different types of RIS-RNTIs. In the case of multiple RIS-RNTIs (RIS-RNTI 1, RIS-RNTI 2, RIS-RNTI 3, etc.) defined in the communication protocol, the DCI can be descrambled by only one RIS-RNTI during the descrambling of the PDCCH by the RIS, and through the corresponding relationship between the RIS-RNTI for successfully descrambling the PDCCH and the operating modes, the operating mode to be adopted by the RIS can be determined.
b. Indication of different operating modes by log 2 (K) bits in the DCI: In the specific field of the DCI, the bit position is set according to the K operating modes supported by the RIS, the RIS gets the DCI and determine which operating mode is to be employed according to the value of the specific field.

The control of signaling overhead can be realized in the following methods including (i) to (iii) as discussed bellow.

a. The panel partitioning strategy information and the number of controllable phases of the reflective units in the operating parameters of the RIS are received, where the panel partitioning strategy information is indicative of the grouping of the reflective units, and the number of controllable phases is the number of phase states supported by the reflective units. In this case, the base station learns that the RIS supports an overall control strategy for the sub-blocks, and thus, after the base station determines the number of sub-blocks after the partitioning is held on the RIS, as well as the number of phase states supported by each sub-block, the base station determines the length of the bits in the DCI for indicating the phase regulation information based on the total number of phase controls.
b. Length of the bits for indicating the phase regulation information in the DCI is limited first. When the base station issues the DCI indication, a rough beam is calculated based on the length of bits. The RIS, after receiving the signaling, further calculates on its own to obtain the accurate beam on the basis of the rough beam based on the location information of the target UE and the CSI, in order to improve the strength of the signal received by the UE.
c. Phase regulation information is sent to the RIS through the control center, in which the control center is wired to the RIS and is adapted to transmit a large amount of data. In this case, the length of bits occupied by the phase control information is not the foremost problem to be solved.

In order to better control the RIS equipment in the communication network, an embodiment of the present disclosure provides a communication standard for the RIS equipment. A new dedicated DCI scrambling code RIS-RNTI is appended in the protocol, which is intended to help the base station distinguish the RIS equipment from ordinary UEs. Since RIS-RNTI is different from the scrambling code employed by the UEs, when the base station issues the DCI indications, the UEs are prevented from undesirable descrambling of the signaling by the RIS-RNTI, and it is ensured that the RIS equipment can correctly receive the DCI indications from the base station by the RIS-RNTI. A controlling strategy between the base station and the RIS based on RIS-RNTI is provided, such that, the base station can better cooperate with the RIS equipment, thus helping the base station to enhance the signal coverage and network performance, and improving the cell multiplexing capacity.

An embodiment of the present disclosure further provides a device for controlling an RIS, which includes at least one processor and a memory configured to communicate and connect with the at least one processor. The memory stores an instruction that is executable by the at least one processor which, when executed by the at least one processor, causes the at least one processor to carry out any one of the methods as described above.

Figure 12:
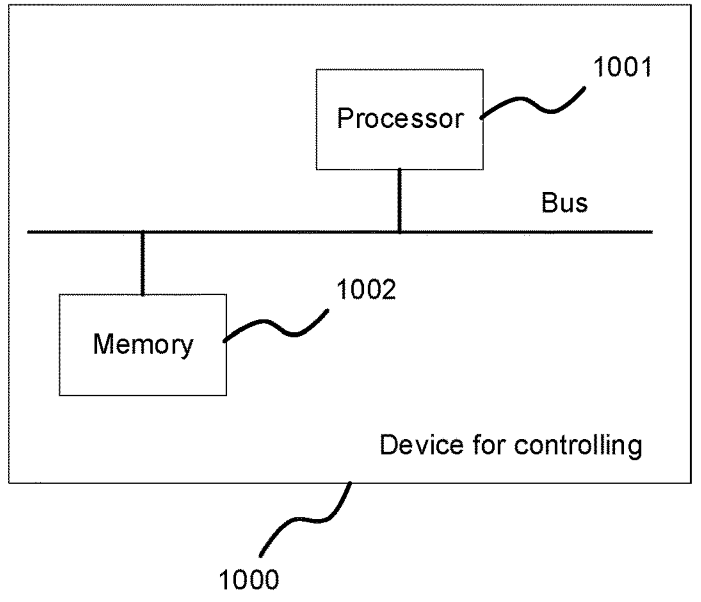
FIG. 12 depicts a schematic diagram showing a device for controlling according to an embodiment of the present disclosure.

Referring to FIG. 12, the control processor 1001 and the memory 1002 in the device for controlling 1000 can be connected for example, through a bus. As a non-transitory computer-readable storage medium, the memory 1002 can be configured to store non-transitory software programs and non-transitory computer-executable programs. In addition, the memory 1002 can include high-speed random-access memory and non-transitory memory, such as at least one disk memory device, flash memory device, or other non-transitory solid-state memory devices. In some implementations, the memory 1002 can include memories remotely located relative to the control processor 1001, and these remote memories may be connected to the device for controlling 1000 through a network. Examples of the above networks include, but are not limited to, the Internet, intranet, local area network, mobile communication network, and combinations thereof.

It can be understood by those having ordinary skills in the art that the device shown in FIG. 12 does not constitute a limitation to the device for controlling 1000 which may include more or less components than those shown, or some components may be combined, or have different component arrangements.

Figure 8:
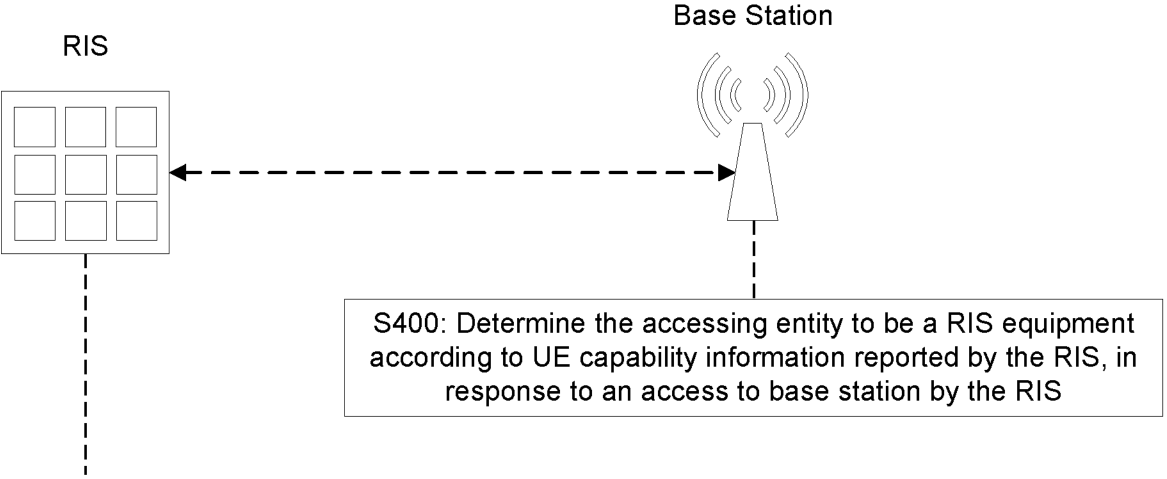
FIG. 8 depicts a flowchart showing the identification of an access entity as RIS equipment by a base station according to an embodiment of the present disclosure.

An embodiment of the present disclosure provides a computer-readable storage medium, which stores computer-executable instructions which, when executed by at least one control processor, e.g., the control processor 1001 shown in FIG. 12, causes the control processor to carry out the operations of any one of the methods described above, for example, the above-described operations S1 to S2 described in conjunction with FIG. 1, S100-S300 described in conjunction with FIG. 2, S310-S320 described in conjunction with FIGS. 3, S330 to S340 described in conjunction with FIG. 4, S350-S380 described in conjunction with FIG. 5, S3-S4 described in conjunction with FIG. 6, S500-S600 described in conjunction with FIG. 7, S400 described in conjunction with FIG. 8, S710-S730 described in conjunction with FIG. 9, or S740-S770 described in conjunction with FIG. 10.

The above-described device embodiments are only illustrative, in which the units illustrated as separate components may or may not be physically separated, that is, they may be located in one place or distributed over several network nodes. Some or all of the modules can be selected according to the practical needs to achieve the purpose of this embodiment.

An embodiment of the present disclosure provides a method for controlling a network node, in order to better control the network node, such as RIS equipment, in communication networks. A dedicated signaling to the network node is provided in an embodiment of the present disclosure. The signaling is intended to regulate the operating mode and/or phase state of the network node, such that the base station and the network node can better cooperate with each other, thus helping the base station to enhance the signal coverage and network performance, and improving the cell multiplexing capacity.

The network performance and coverage of the base station can be enhanced in various embodiments of the present disclosure.

It shall be appreciated by a person having ordinary skills in the art that all or some of the steps and systems disclosed above can be implemented as software, firmware, hardware, and their appropriate combinations. Some or all physical components can be implemented as software executed by a processor, such as a central processing unit, a digital signal processor, or a microprocessor, or as hardware, or as an integrated circuit, such as an application-specific integrated circuit. Such software can be distributed on computer-readable media, which can include computer-readable storage media (or non-transitory media) and communication media (or transitory media). As is well known to a person having ordinary skills in the art, the term computer-readable storage media includes volatile and nonvolatile, removable and non-removable media implemented in any method or technology for storing information such as computer-readable instructions, data structures, program modules, or other data. Computer-readable storage mediums include, but are not limited to, RAM, ROM, EEPROM, flash memory or other memory technologies, CD-ROM, digital versatile disks (DVD) or other optical disk storage, magnetic boxes, tapes, magnetic disk storage or other magnetic storage devices, or any other medium that can be used to store desired information and accessible by a computer. Furthermore, it is well known to those having ordinary skills in the art that communication media usually contains computer-readable instructions, data structures, program modules, or other data in modulated data signals such as carrier waves or other transmission mechanisms, and can include any information delivery media.

Described above is a description of several embodiments of the present disclosure, but the present disclosure is not limited to the above embodiments. Those having ordinary skills in the art can make various equivalent modifications or substitutions without departing the scope of the present disclosure, and these equivalent modifications or substitutions are within the scope defined by the claims of the present disclosure.

What is claimed is:

1. A method for controlling a network node, applied to the network node, the method comprising:

receiving a signaling sent by a base station, wherein the signaling is indicative of at least one of, an operating mode or a phase state of a set of reflective units of the network node, and the signaling is downlink control information (DCI) scrambled at the base station using a scrambling code dedicated to the network node, wherein the operating mode at least comprises at least one of a reflection mode, transmission mode, active mode, or passive mode; and regulating at least one of, the operating mode or the phase state of the set of reflective units of the network node according to the signaling.

2. The method as claimed in claim 1, wherein receiving the signaling sent by the base station comprises, receiving the signaling sent by the base station through a physical downlink control channel (PDCCH) or through a physical downlink shared channel (PDSCH).

3. The method as claimed in claim 1, wherein the set of reflective units comprises at least one reflective unit, the signaling comprises downlink control information (DCI) indicative of a phase state of the set of reflective units, and the DCI is scrambled by the base station through a scrambling code; and regulating at least one of, the operating mode or the phase state of the network node according to the signaling comprises, descrambling the signaling through the scrambling code to obtain the DCI; and regulating the phase state of the set of reflective units according to the DCI.

4. The method as claimed in claim 3, wherein the scrambling code corresponds to the operating mode of the network node, and regulating the phase state of the set of reflective units according to the DCI comprises, determining the operating mode of the network node according to the scrambling code; and controlling, in the operating mode, the phase state of the set of reflective units according to the DCI.

5. The method as claimed in claim 1, wherein the signaling is indicative of the operating mode of the network node, a mode indicating field in the DCI corresponds to the operating mode of the network node, and regulating the operating mode of the network node according to the signaling comprises, identifying the mode indicating field in radio resource control (RRC), medium access control (MAC), or downlink control information (DCI) according to a type of signaling; and determining the operating mode of the network node according to the mode indicating field.

6. The method as claimed in claim 3, wherein regulating the phase state of the set of reflective units according to the DCI comprises, acquiring state information reported by a user equipment (UE), wherein the state information comprises at least one of, location information, or channel state information of the UE;

acquiring first phase regulation information that is indicative of the phase state of the set of reflective units from the DCI;

determining second phase regulation information according to the first phase regulation information, and the state information; and controlling the phase state of the set of the reflective units according to the second phase regulation information.

7. The method as claimed in claim 1, wherein the network node is in communicative connection with a control center, and the method further comprises, receiving a regulation instruction sent by the control center to regulate an operating state or the operating mode of the network node according to the regulation instruction; or, receiving third phase regulation information sent by the control center to regulate a phase state of the set of reflective units according to the third phase regulation information, wherein the third phase regulation information is sent by the base station to the control center, or the third phase regulation information is acquired according to state information reported by a UE to the control center, or the third phase regulation information is acquired according to the state information of the UE reported to the control center by the network node; and wherein the state information comprises at least one of, location information, or channel state information of the UE.

8. The method as claimed in claim 6, wherein the network node comprises a set of reflective units comprising at least one reflective unit, and the method further comprises, reporting an operating parameter of the network node to the control center or to the base station;

wherein the operating parameter comprises at least one of, a panel aperture, a density of the reflective units, a frequency characteristic, information on reciprocity characteristics, a degree of difference in each direction, an adjustable angular interval, a panel partitioning strategy, a number of physical arrays, a number of virtual reflective units, or a supported operating mode.

9. The method as claimed in claim 3, wherein the scrambling code is a radio network temporary identity for identifying the network node.

10. A method for controlling a network node, applied to a base station, the method comprising:

determining at least one of, an operating mode, or a phase state of a set of reflective units of the network node; and sending a signaling that is indicative of at least one of, the operating mode, or the phase state of the set of reflective units of the network node, to the network node, wherein the signaling is downlink control information (DCI) scrambled at the base station using a scrambling code dedicated to the network node.

11. The method as claimed in claim 10, wherein the set of reflective units comprises at least one reflective unit, and sending the signaling to the network node comprises, determining a scrambling code according to a network access state of the network node in a serving cell; and sending the signaling to the network node, wherein the signaling comprises downlink control information (DCI) that is indicative of the phase state of the network node, and the DCI is scrambled by the scrambling code.

12. The method as claimed in claim 11, further comprising, receiving panel partitioning strategy information and a number of controllable phases that are reported by the network node, wherein the panel partitioning strategy information is indicative of a grouping of the reflective units, and the number of controllable phases is the number of phase states supported by the reflective units;

determining a total number of phase controls of the network node according to the panel partitioning strategy information and the number of controllable phases; and determining a length of bits occupied by a field corresponding to phase regulation information in the DCI according to the total number of phase controls, wherein the phase regulation information is indicative of a phase state of the set of reflective units.

13. The method as claimed in claim 11, further comprising, acquiring a length of bits occupied by a field corresponding to phase regulation information in the DCI, wherein the phase regulation information is indicative of a phase state of the set of reflective units;

acquiring a number of controllable phases of the reflective units and the state information of a user equipment (UE), wherein the number of controllable phases is the number of phase states supported by the reflective units, and the state information comprises at least one of, location information, or channel state information of the UE;

determining first phase regulation information according to the number of controllable phases, the state information and the length of bits; and determining the DCI according to the first phase regulation information, to enable the network node to determine second phase regulation information according to the first phase regulation information and the state information in the DCI.

14. A device for controlling a reflecting intelligent surface (RIS), comprising at least one processor and a memory configured to communicate and connect with the at least one processor;

wherein the memory stores an instruction executable by the at least one processor which, when executed by the at least one processor, causes the at least one processor to carry out the method as claimed in claim 1.

15. A non-transitory computer-readable storage medium storing a computer-executable instruction which, when executed by a processor, causes the processor to carry out the method as claimed in claim 1.

16. A device for controlling a reflecting intelligent surface (RIS), comprising at least one processor and a memory configured to communicate and connect with the at least one processor;

wherein the memory stores an instruction executable by the at least one processor which, when executed by the at least one processor, causes the at least one processor to carry out the method as claimed in claim 10.

17. A non-transitory computer-readable storage medium storing a computer-executable instruction which, when executed by a processor, causes the processor to carry out the method as claimed in claim 10.

* * * * *